LEEPER & KIDDER.
Wheel-Cultivator.
Reissued June 13, 1865.
No. 1,996.
Fig. 1.
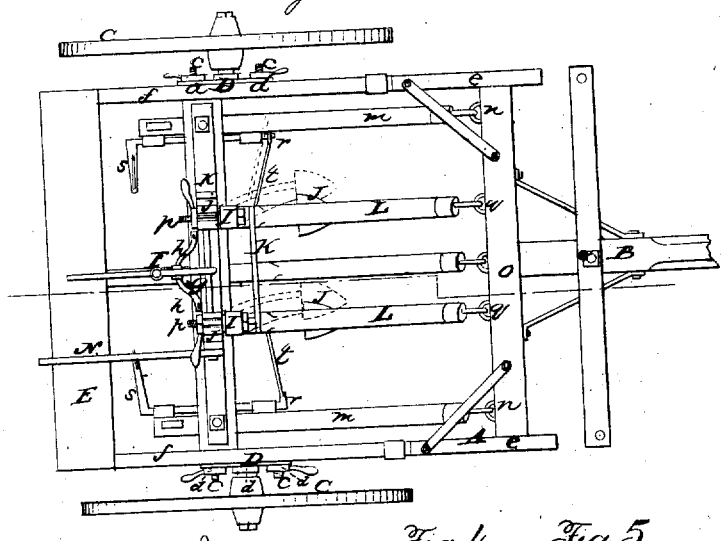
Fig. 4.
Fig. 5.
Fig. 2.
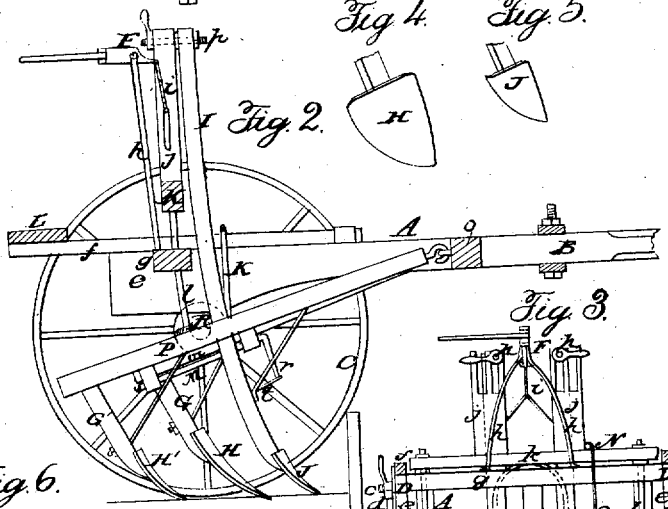
Fig. 3.
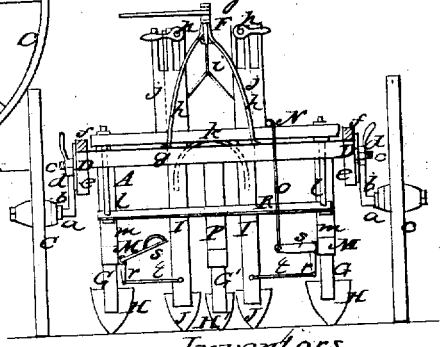
Fig. 6.
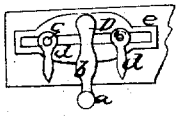
Witnesses.
J. W. Coombs
R. S. Spencer
Inventors.
R. A. Leeper
Z. B. Kidder
per Munn & Co
Attorney
N. PETERS, PHOTO-LITHOGRAPHER, WASHINGTON, D. C.

UNITED STATES PATENT OFFICE.

R. A. LEEPER AND Z. B. KIDDER, OF SAN JOSÉ, ASSIGNORS TO DILLS, KERN & CO., OF ATALANTA, ILLINOIS.

IMPROVEMENT IN CULTIVATORS.

Specification forming part of Letters Patent No. 31,393, dated February 12, 1861; Reissue No. 1,996, dated June 13, 1865.

*To all whom it may concern:*

Be it known that we, R. A. LEEPER and Z. B. KIDDER, of San José, in the county of Mason and State of Illinois, have invented a new and useful Improvement in Cultivators; and we do hereby declare that the following is a full, clear, and exact description of the same, reference being had to the accompanying drawings and the letters and figures marked thereon, which form part of this specification.

Our said invention relates to that class of cultivators which are mounted upon wheels and stride the row of plants to be cultivated; and it consists, first, in a novel mode of rendering the inside plows, or those which run nearest the row, adjustable both vertically to regulate their depth in the soil or to raise them from the ground when desired, and laterally to adapt them to the irregularities and sinuosities in the rows and avoid tearing up and otherwise injuring the plants, while at the same time they may be arranged so as to run nearer to or farther from the row, as may be desired, according to the variable size of the plants and the nature of the soil.

Our invention consists, second, in a novel arrangement whereby the machines may be kept in equipoise about the axle upon which it is supported, whether the operator rides upon the machine during its operation or walks behind it between the rows, as he may prefer.

Our invention consists, third, in a novel arrangement for elevating the plows from the ground.

To enable those skilled in the art to understand how to construct and use our invention, we will now describe the same with particularity, making reference in so doing to the aforesaid drawings, in which—

Figure 1 represents a plan or top view of our invention; Fig. 2, a side sectional view of the same at the line *x* in Fig. 1; Fig. 3, a rear view or elevation thereof; and Fig. 4 is a detached view of one of the axles, showing its adjustability with respect to the frame of the cultivator.

Similar letters of reference in the different figures denote the same parts of our invention.

A represents the rectangular frame of the cultivator, *e e* being the sides, and *o g* the front and rear cross-beams, respectively, to the said front cross-beam of which the draft-pole B is attached, as shown, C C being the wheels upon which the machine is mounted. The said wheels are arranged on spindles *a a*, attached to the vertical bars *b b* at right angles, whose upper ends are firmly secured to the slotted plates D D, which are provided with horizontal slots, as shown, and are secured to the sides of the frame by the screw-bolts *c*, passing through said sides *e e* and the slot in D and the nuts *d*, as shown in Fig. 4.

By loosening the nuts *d* the plates D may be moved longitudinally with respect to the frame and again secured, thereby adjusting the position of the axle with respect to said frame, varying the position of the fulcrum, and enabling the machine to be kept in equilibrium, whether the operator rides or walks, the seat being arranged upon the rear ends of the elastic bars *f f*, which are attached to the sides of the frame, as shown, and project back of the axles which support the frames.

To the rear cross-beam, *g*, there are attached two curved bars, *h h*, the upper ends of which are connected by a bolt, which serves as a fulcrum for the lever F, the front end of which is attached by a chain, *i*, to two uprights or standards, *j j*, which are connected to the bar *k*, resting upon the cross-bar *g*. To each end of said bar *k* there are attached the rods *l l*, which pass down loosely through the cross-bar *g*, and are attached to the plow-beams *m m*, which are connected at their front ends to the front cross-bar, *o*, by universal joints *n*. To the rear ends of said beams *m m* are attached the standards G G, to which are secured the shares H H. The upper ends of said uprights *j j* are provided with two or more vertical slots, and the upper ends of the curved bars I I are attached thereto and said bars suspended therefrom by means of bolts *p p*, passing through one of said slots and fastened by set-screws. By this means the said bars I I may be adjusted vertically, and the lower ends thereof are adjusted nearer to or farther from each other by suspending them in the inner or outer slots in the ends of the standards

*j j*. To the lower ends of said bars I I are attached the shares J J, and they are also connected with each other by the curved bar K. To each of said bars are attached the beams L, the front ends of which are connected by universal joints to the front cross-bar, *o*.

To the inner side of each beam *m m* there is attached a crank-shaft, M, which is provided with two arms, *r s*, one at each end of said shaft M, said arms *r s* being arranged at right angles with respect to each other, or at any other angle with respect to each other, or with respect to the shaft M, provided that the operation be substantially as herein described.

The front arms *s* are connected by the rods *t* to the lower parts of said bars I I, and to the rear crank-arms *s* of one of said shafts M the lever N is attached by means of the connecting-rod O, said lever being fulcrumed at one end to one of the uprights *j*.

The operation of our invention is as follows: As the implement is drawn along the driver, by pressing his feet upon the rear crank-arms *s* when riding, or by means of the lever N when walking, can readily oscillate the bars I I, pivoted at their upper ends, as aforesaid, from side to side, so as to adapt the same to the curves or irregularities of the rows; and all the shares may be raised or lowered simultaneously by means of the lever F and its hereinbefore-described connections. The beam P, standard G, and share H′ are to be used only when the machine is employed for the purpose of plowing or dragging in grain, R being a cross-bar attached thereto, whose ends may be attached to the rods *l*, so as to enable said beam, standard, and share to be raised with the others by the operation of the lever F.

By having all the plow-beams attached independently to the frame A at the cross-bar *o*, so as to allow a separate motion to each, the plows readily adapt themselves to any irregularities of the ground without regard to the position of the frame A on wheels C, as said plow-beams have no rigid connection with the frame, and may move laterally or vertically, either together or independently, without affecting the position of the frame in the least.

Having described our invention and its operation, we will now specify what we claim and desire to secure by Letters Patent:

1. Suspending the share-standards I I upon pivots or bolts at their upper ends, substantially as and for the purposes shown and described.

2. The combination and arrangement of the share-standards I I, slotted supports *j j*, and beams L L, jointed at their front ends, as and for the purposes specified.

3. The employment of the crank-shaft M, provided with the arms *s* and *r*, arranged and operating substantially as and for the purposes specified and described.

4. The combination of the oscillating standards I I, beams L L, crank-shafts M M, provided with the arms *r s* and rods *t*, arranged and operating as specified and described.

5. In combination with said standards I, beams L, connecting-bar K, crank-shaft M *r s*, and rod *t*, the rod O and lever N, arranged and operating as and for the purposes specified and shown.

6. The combination and arrangement of the oscillating standards I I, supports *j j*, cross-bar *k*, rods *l l*, and beams *m m*, substantially as and for the purposes specified.

7. In combination with said oscillating standards I I, uprights *j j*, cross-bar *k*, rods *l l*, and beams *m m*, the employment of the fulcrum L upon the cross-bar *g*, lever F, and cords *i i*, all arranged and operating substantially as and for the purposes set forth.

8. The arrangement of the spindles *a a*, bars *b b*, and slotted plates D D with the frame A and seat E, all arranged as and for the purposes shown and specified.

R. A. LEEPER.
Z. B. KIDDER.

Witnesses:
JONATHAN COY,
WM. H. LEEPER.